Dec. 27, 1927.
C. McL. MOSS
1,654,303
AUTOMATIC TRANSFORMER SWITCHING SYSTEM
Filed March 23, 1922
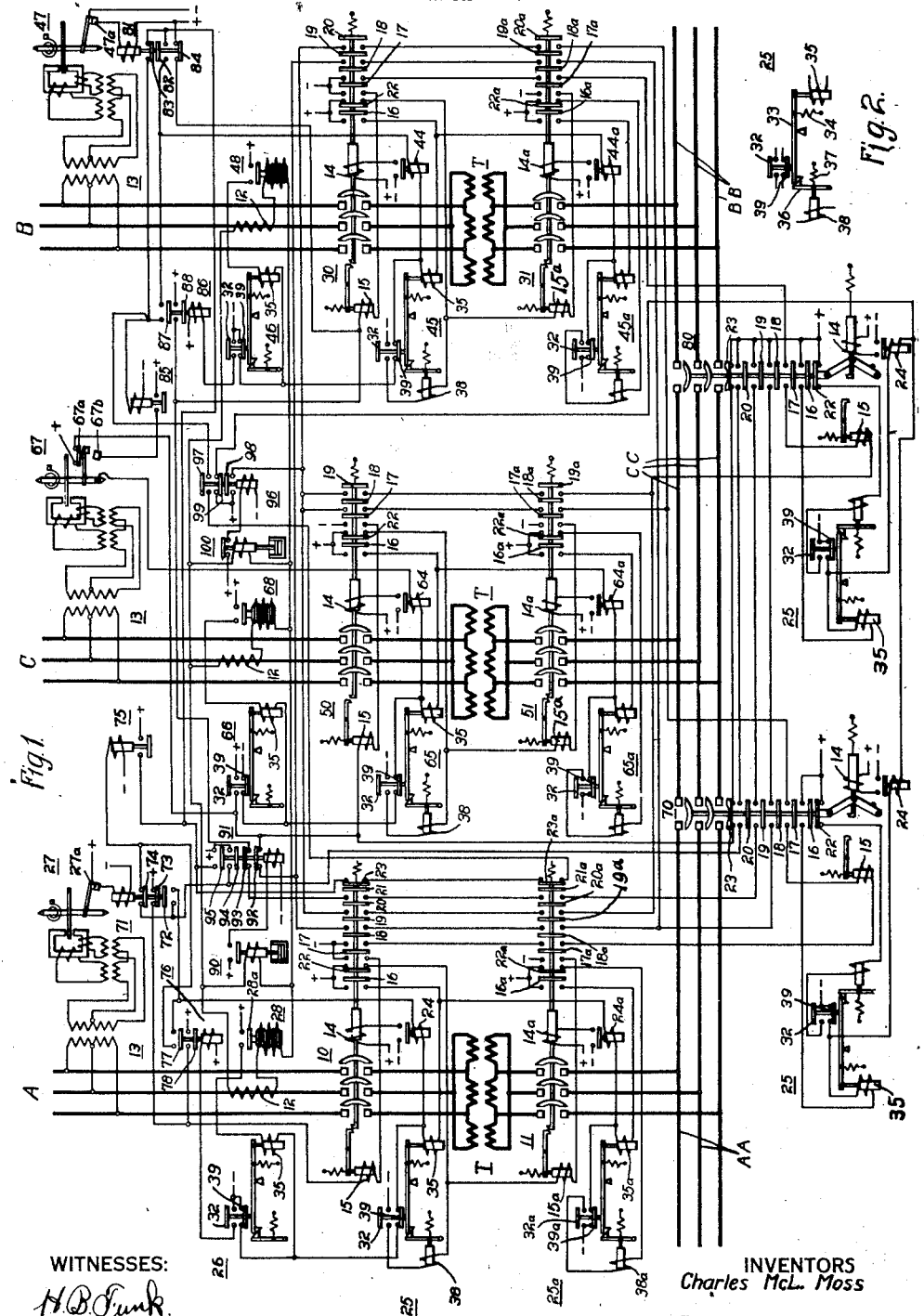
WITNESSES:
INVENTORS
Charles McL. Moss
BY
ATTORNEY Patented Dec. 27, 1927.

1,654,303

UNITED STATES PATENT OFFICE.

CHARLES McL. MOSS, OF PITTSBURGH, PENNSYLVANIA, ASSIGNOR TO WESTINGHOUSE ELECTRIC AND MANUFACTURING COMPANY, A CORPORATION OF PENNSYLVANIA.

AUTOMATIC TRANSFORMER-SWITCHING SYSTEM.

Application filed March 23, 1922. Serial No. 545,968.

My invention relates to automatic control systems and particularly to systems for automatically switching transformers.

One object of my invention is to provide a control system for a station provided with a plurality of main sources of energy and an auxiliary source of energy whereby a plurality of bus sections may be selectively energized from the various sources of energy in accordance with the load demand upon the bus sections, either respectively or collectively and in accordance with the electrical condition of the several sources of energy.

Another object of my invention is to provide a control system whereby the supply of energy from one or more of the sources to the bus sections may be selectively controlled by connecting the bus sections to only such number of sources of energy that the load demand will be less than the total capacity of such source or sources but more than the capacity of one source less.

Another object of my invention is to provide a transformer station containing two main transformer lines and an auxiliary transformer line with corresponding bus sections and a system of control whereby only one of the main lines will be employed to supply energy to the bus sections while the demand thereon does not exceed the capacity of one line, and whereby the other main line may be connected to the bus sections to distribute the load between such lines.

Another object of my invention is to provide a control system for a distribution system, such as mentioned in the previous paragraph, whereby the auxiliary or stand-by transformer line may be substituted for either main line or for both main lines if such line or lines should become faulty or ineffective.

Another object of my invention is to provide a control system for a distribution system, of the above-indicated character, wherein all of the bus sections may be tied together, when energized from one source of energy, and separated when severally energized from the respective sources of energy associated with such bus sections.

Still another object of my invention is to provide a system, of the above-indicated character, wherein the main sources of energy may be connected to the load bus sections in a predetermined sequence in accordance with the demand and the circuit conditions.

The main object of my invention, of course, is to obviate the excessive losses and heating of transformers by exciting current, by rendering the control equipment of a transformer station entirely automatic and selective in its operation to connect a sufficient number of transformers or similar sources of energy to bus sections wherefrom load feeders may be energized, and to selectively control the connection of additional sources, as required, or the substitution of an auxiliary or stand-by source of energy upon the failure of any one of the main sources.

In the system herein disclosed, I provide means for connecting two main incoming lines and one auxiliary, or spare, line through transformers to corresponding bus sections. Switching equipment is provided for connecting the respective incoming lines to the respective buses and for connecting the spare, or auxiliary, bus to either or to both of the main bus sections to selectively control the distribution of energy from one of the main incoming lines or from the spare incoming line to one or to both of the bus sections; or to selectively control the distribution of energy from each main incoming line to its respective bus section only; or to substitute the spare, or auxiliary, incoming line for either main incoming line.

The three incoming lines are arranged to be connected to the bus sections in a predetermined sequence, depending upon the condition of the lines and the load demand on the bus sections to which they are to be connected. The main supply lines will be connected first and second in sequence and the auxiliary supply line will be connected third in sequence. Thus, while the load demand may be supplied by one transformer, one of the supply lines will supply such demand. If the load should increase, both main supply lines would supply such increased demand. If one of the main supply lines should be disconnected because of abnormal conditions therein, the auxiliary, or spare, supply line would be substituted therefor.

Should the abnormal conditions of the disconnected main supply line be cleared, that line would be immediately reconnected and the auxiliary line disconnected. Where the demand on the system may be supplied by one supply line, the auxiliary line will be connected to supply such demand only when the conditions in the other two lines are abnormal and both of said lines disconnected.

Figure 1 of the accompanying drawings is a diagrammatic view of the distribution transformer system and the control system therefor that embodies my invention; and Fig. 2 is a schematic view of a transfer control switch employed in the system in Fig. 1.

In general, the main-station equipment comprises two main incoming lines A and B, respectively, and an auxiliary, or spare, incoming line C.

The station layout further comprises two main bus sections AA and BB, and an auxiliary bus section CC, that are respectively adapted to be connected to the corresponding incoming lines. Switching equipment is provided between the auxiliary bus section and both main bus sections to provide a flexible arrangement whereby energy may be transmitted from any one of the incoming supply lines to both main bus sections, or from each of the main supply lines only to the corresponding bus sections.

The main supply line A contains a high-tension circuit interrupter 10 and a low-tension circuit interrupter 11 between which is connected a transformer T. The terminals of the interrupter 11 are connected to the bus section AA. The main supply line B is similarly provided with a high-tension interrupter 30 and a low-tension interrupter 31, and the supply line C is also similarly provided with a high-tension interrupter 50 and a low-tension interrupter 51 between the respective pairs of which transformers are connected. The interrupter 31 is connected to the bus section BB and the interrupter 51 is connected to the auxiliary bus section CC.

The supply lines are each provided with a current transformer 12 and a plurality of potential transformers 13 whereby the electrical condition of the lines may be ascertained. The high-tension interrupters are each provided with a closing coil 14, a trip coil 15 and a plurality of auxiliary interlock switches respectively numbered from 16 to 23, inclusive, depending upon the number of switches required. The interlock switches 22 and 23 are closed, and the other interlock switches are open, when the interrupters are open.

Because of the large value of current that is required to operate the closing coils, contactor switches, of sufficient current-carrying capacity, are employed to connect the associated closing coils directly to the control source of energy. The operation of the contactor switch 24, that is associated with the interrupter 10, is controlled by a transfer relay 25 which is controlled by the interrupter 10.

The transfer relay 25, that is illustrated in Fig. 2, comprises a main switch 39 that normally is closed and an auxiliary switch 32 that normally is open. The switches are actuated and controlled by a pivoted member 33 that normally is maintained in its operative position by a spring 34 and actuated therefrom to a biased position by an operating coil 35. When the pivoted member 33 is actuated from its normal position to its biased position, a latching member 36 is actuated by a spring 37 to engage the pivoted member 33 and maintain that member in such biased position that the switch 39 is maintained open and switch 32 is maintained closed. The resetting of the relay is effected by the actuation of the latching member 36 from its latching position by means of a resetting coil 38.

The low-tension circuit interrupters are each provided with a closing coil, a trip coil, auxiliary interlock switches and a transfer relay. The numerals assigned to the elements associated with the low-tension interrupters correspond to the numerals assigned to the apparatus and elements associated with the high-tension circuit interrupters with the addition of the subscript "a", as, for example, closing coil 14a and trip coil 15a.

A lock-out relay 26 is employed with the main supply line A to preclude the connection of that line to its bus section AA upon the occurrence of abnormal conditions, such as internal faults, within the interrupter or the transformer. The lock-out relay 26 is similar in construction and in operation to the transfer relay 25 but is illustrated without the reset coil 38 since the resetting of this relay is desired only after an abnormal or faulty condition in the circuit apparatus has been cleared or eliminated by an attendant.

In order to control the operation of the control apparatus in accordance with the correct phase rotation and a predetermined minimum voltage on the supply line A, a phase relay 27 is employed that is responsive both to the phase rotation and to the voltage of the line A. This relay is energized from the potential transformers 13, and, when the phase rotation is correct and the voltage is above a predetermined minimum value, its switch 27a is maintained open. The switch 27a closes either upon the occurrence of low-voltage conditions, phase reversal or phase failure.

In order to protect the transformer from damage because of overload or overheating, or aggravation of internal faults, a relay 28 is provided that is energized in accordance with the thermal condition of the transformer and that serves to close its switch 28a when the transformer becomes faulty or is heated to a dangerous temperature. The switch 28a controls the operation of the lockout relay 26.

Although, for the sake of simplicity, I am showing merely a single relay 28 that is energized or controlled in accordance with the thermal condition of the circuit and the transformer, it is obvious that other relays may, and undoubtedly will, be employed to effect protection of the transformer against various faults.

Similarly, other relays may be employed to effect protection of the circuit and of the equipment therein against different kinds of faults. The single protective relay that I show may, therefore, be regarded as merely indicative of general means for protecting the circuit and the transformer and other equipment therein against any fault or abnormal condition that might occur, such as failure of oil, air or water-cooling systems of the transformer.

The other main supply line, B, is similarly provided with a closing coil relay 44, a transfer relay 45, a lockout relay 46, a phase relay 47 and a thermal relay 48.

The auxiliary supply line C likewise is provided with a closing-coil relay 64, a transfer relay 65, a lockout relay 66, a phase relay 67 and a thermal relay 68.

It may be here noted that the phase relay 67, that is associated with the auxiliary supply line C, is provided with two switches, one of which, 67b, is closed only when the line conditions are normal and the other of which, 67a, is closed only when the line conditions are abnormal.

The main bus section AA is adapted to be connected to the auxiliary bus CC by means of a circuit interrupter 70, and the main bus section BB may be connected to the auxiliary section CC by an interrupter 80. Each interrupter is provided with a closing coil 14 and a trip coil 15. Auxiliary interlocking switches 16 to 21, inclusive, are provided for interlocking circuits and are actuated by, and with, the respective interrupters 70 and 80.

Contactor switches 24 are employed to control the circuits of the closing coils 14 of the interrupters 70 and 80, and transfer relays 25 are employed to control the operation of the contactor switches 24, as previously described.

The apparatus so far described comprises the equipment that is associated with the individual circuit interrupters for controlling the actuation thereof. The apparatus to be hereinafter described comprises the selective switching equipment that automatically controls the apparatus previously enumerated to effect the connections of the various lines and bus sections in accordance with predetermined desired sequences for the various methods of operation.

A control relay 71 is controlled by the phase and voltage relay 27, that is associated with the supply line A, to open a switch 72 and to close two switches 73 and 74, respectively, when or while abnormal conditions, such as phase failure, phase reversal or low voltage, occur or exist on the line A. A relay switch 75 is controlled, under certain conditions, by the switch 74 to effect the energization of control circuits that will be later described. An auxiliary relay 76, that is adapted to be energized only when the lock-out relay 26 is actuated in response to abnormal conditions in the line A or transformer T, closes two switches 77 and 78, under such conditions, to control several circuits to be described later.

The line B is also provided with three relays 81, 85 and 86 similar to, and corresponding to, the relays 71, 75 and 76, just described. The relay 81 opens a switch 82 and closes two switches 83 and 84, that correspond to the switches 73 and 74, of relay 71, in response to predetermined abnormal phase or voltage conditions in the line B. The relay 85 closes its switch when energized. The relay 86 is provided with two switches 87 and 88 that are closed when the relay 86 is energized.

The current transformers 12, that are associated with the supply lines, are connected in parallel-circuit relation and energize a time-delay control relay 90 in accordance with the sum of the currents traversing all of the supply lines A, B and C. The control relay 90 is adapted to close its switch only when the sum of such currents attains, or exceeds, a predetermined value, namely, a value slightly greater than the value corresponding to the full-load capacity of one line, for example, 103% of full load. Under such conditions, the relay 90 energizes a switch relay 91. The relay 91, when energized, opens two switches 92 and 93, and closes two switches 94 and 95.

A second time-delay control relay 100 is similarly energized in accordance with the sum of the currents traversing all of the supply lines and is adjusted to operate to close its switch when the sum of such currents decreases to, or below, a predetermined value, namely, the normal full-load capacity of one of the supply lines.

The relay 100, when energized only to, or less than, the predetermined extent corresponding to full-load capacity of one line, effects the energization of a switch relay 96. The switch relay 96, when energized, opens switches 97 and 98 and closes switch 99.

The relays 90 and 100 are the selective control relays that control the functioning of the other control apparatus and may be regarded as the brains of the system. Relay 90 will hereafter be referred to as the overload relay and relay 100 will be referred to as the underload relay.

OPERATION.

*Connecting line "A" to system.*

All main apparatus are illustrated in the normal de-energized positions and the control apparatus are illustrated in the positions that would be occupied thereby were the incoming lines disconnected from the sources of energy.

At least one supply line will always be connected to the bus sections, if that line be normal. Under normal conditions, the supply line A will be preferred. The operation of connecting the supply line A to the bus section AA will now be described.

Let it be first assumed that the entire system is de-energized, that is, the supply lines A, B and C are de-energized. The underload relay 100, therefore, permits the closing of its switch to energize the relay 96. The relay 96 closes the switch 99, whereupon a circuit is completed to energize the contactor switches 24 associated with the interrupters 70 and 80 to effect the closing of the bus-section interrupters 70 and 80. That circuit starts from the positive conductor of the control circuit through switch 99 of relay 96, coils of the contactor switches 24, and switches 39 of the transfer relays 25 of the interrupters 70 and 80, respectively, to the negative conductor of the control circuit.

It may be here noted that, under all conditions, when the load is less than the capacity of one line, both bus sections AA and BB will be connected by the interrupters 70 and 80 to the bus section CC.

As soon as the interrupters 70 and 80 are closed, and subsequently latched, the circuits of the closing coils are interrupted at the switches 39 of the transfer relays. The switches 39 are opened upon the energization of the operating coils 35 of the transfer relays. The circuits of the coils 35 are completed by the interlock switches 16 of the respective interrupters 70 and 80 and then opened by the switches 39 of the respective transfer relays. The circuits of the closing coils are thus opened immediately after the interrupters are closed.

Assuming now that the supply line A becomes energized, the relay 27 opens its switch 27a to de-energize the relay 71. The switch 72 is thereupon closed to complete the circuit of the coil of the contactor switch 24 to effect the closing of the interrupter 10. That circuit is completed from positive control conductor through switches 20 of the interrupters 70 and 80, switch 72 of relay 71, coil of contactor switch 24 and switches 39 of the transfer relay 25 and the lock-out relay 26, respectively, to the negative control bus conductor. Thus, as soon as the supply line A is energized, the interrupter 10 is closed.

As soon as the interrupter 10 closes, the auxiliary interlock switches 16 to 20, inclusive, close, and the switches 22 and 23 open. The switch 16 thereupon completes two circuits. The first circuit comprises the switch 16, the operating coil 35, of the transfer relay 25, and the switches 39 of the relays 25 and 26, respectively. The coil 35 is thereupon energized to actuate the transfer relay 25 to its biased position, thereby opening the switch 39 and closing the switch 32. Upon the opening of the switch 39, the circuit of the contactor switch 24 is opened and the closing coil 14 is de-energized. The interrupter 10 is latched in its closed position, however.

The other circuit that is controlled by the switch 16 is the closing circuit for the low-tension interrupter 11. That circuit includes the switch 16, the operating coil of the contactor switch 24a and the switch 39a of the low-tension transfer relay 25a. The interrupter 11 is closed in a manner similar to the closing of the high-tension interrupter 10, and, immediately after the closing of the interrupter, the interlock switch 16a energizes the operating coil 35a of the transfer relay 25a to open the switch 39a to preclude further energization of the closing coil 14a. Both high-tension and low-tension interrupters 10 and 11 are now in their closed positions and the supply line is connected to the bus section AA through the transformer.

The high-tension and the low-tension interrupters of the circuits B and C, respectively, are similarly so interlocked that, upon the closing of the high-tension interrupter 30 or 50, the closing of the corresponding low-tension interrupter is effected and the circuits of the respective closing coils subsequently opened by the associated transfer relays 25 and 25a, respectively.

*Line "A" overloaded. Line "B" also then connected.*

When the load increases to a value in excess of the full-load capacity of the line A, it is desired to connect the line B to its bus section BB and subsequently to open the interrupters 70 and 80 to permit the lines A and B to provide energy for their respective bus sections only. It is assumed that line B is normal.

Upon the increase of the load, the overload control relay 90 closes its switch in an interval of time that is inversely proportional to the increase of the load to energize the relay 91 to actuate its respective switches. The switch 95, which is thereupon closed, completes a circuit from positive control through the switch 82, of relay 81, the closing-coil contactor switch 44 and the switches 39 of the relays 45 and 46, respectively. It is to be remembered that the relay 81 is shown in Fig. 1 in the position of no voltage on the circuit B, and that the impression of a voltage upon the circuit B results in the actuation of the relay 81 to its de-energized position by the operation of the relay 47. The closing-coil contactor switch 44 thereupon energizes the closing coil 14 to close the high-tension interrupter 30, after which the closing-coil switch 44 is de-energized by the switch 39 of the transfer relay 45. After the closing of the high-tension interrupter 30, the low-tension interrupter 31 is closed, and latched in such position, after which its closing coil is also de-energized. The circuit B is now connected to its bus section BB and it is now but necessary to open the interrupters 70 and 80.

Since, by reason of the increased load, the relay 96 is in its de-energized position, the switch 98 is closed. The circuit of the trip coil 15, of the interrupter 70, is, therefore, completed by the switches 20 and 20a of the interrupters 30 and 31, when they are closed, from positive control through switch 98 of relay 96, switches 20 and 20a of interrupters 30 and 31, switch 17 and trip coil 15 of the interrupter 70, and switches 18a and 18, of the interrupters 11 and 10, respectively, to negative control.

Similarly, the circuit of the trip coil 15 of the interrupter 80 is completed by the switches 18 and 18a, of the interrupters 30 and 31, respectively, from negative control, through switches 18 and 18a, switch 17 and trip coil 15 of the interrupter 80, switches 20a and 20 of interrupters 11 and 10, and switch 98 of relay 96 to positive control. Both interrupters 70 and 80 are, therefore, opened when both lines A and B are connected to their respective bus sections.

*Lines "A" and "B" connected to system. Load decreases. Line "B" is then disconnected.*

If the load should now decrease to a value that could be supplied by the line A alone, the interrupters 70 and 80 would be reclosed to connect the bus section BB to the supply line A, and the supply line B would subsequently be disconnected from the system.

We shall now trace the various circuits for effecting this result. Since the load is decreased to a value that is less than the full-load capacity of one line, the overload relay 90 will open its switch, and the underload relay 100 will close its switch in an interval of time that is inversely proportional to the decrease of the load to energize the relay 96. The switch 99 is thereupon closed to complete the circuits of the closing-coil contactor switches 24 that are associated with the interrupters 70 and 80, respectively, and those interrupters are thereupon closed. It is now desired to trip the interrupters 30 and 31 to disconnect the line B from the bus section BB.

When the interrupters 70 and 80 close, the switches 19 complete the circuit of the trip coil 15 of the interrupter 30. This circuit is completed from positive control through switches 19 of the interrupters 80 and 70, switches 21a and 21 of interrupters 11 and 10, switch 93 of relay 91, and the trip coil 15 and the switch 17 of interrupter 30 to negative control. The trip coil 15 is energized and the interrupter 30 is thereupon opened. The subsequent closing of the switch 22 completes the circuit through the trip coil 15a of the low-tension interrupter 31, whereupon the opening of that interrupter is also effected. The trip circuit for the low-tension interrupter 31 is completed from positive control through switch 22 of interrupter 30, and trip coil 15a and switch 17a of interrupter 31, to negative control. Line B is now disconnected from its bus section and line A is connected to both bus sections.

In the operation just described, it has been shown that, if the load decreases to a value equal to, or less than, the full-load capacity of one line, and both supply lines A and B are connected to their respective bus sections, the supply line B will be disconnected and the total load will be transferred to the supply line A. This operation was described on the assumption that both supply lines A and B remain normal. If, however, while both lines A and B are serving their respective bus sections, abnormal conditions should occur on either of supply lines A and B, while the total load exceeds the full-load capacity of one line, the auxiliary, or spare, line C will be substituted for the faulty or ineffective supply line A or B.

*Lines "A" and "B" connected to system. Line "A" becomes faulty. Line "C" substituted for line "A".*

The operation whereby the auxiliary line C is substituted for the supply line A, when faulty or ineffective, will now be considered. The supply line A may be disconnected from the system for two reasons. First, it may be disconnected because of abnormal conditions on the supply line, such as phase failure, phase reversal or low voltage. Second, it may be disconnected because of abnormal conditions in the transformer, such as internal faults that would cause excessive heating to a dangerous temperature.

In the first instance, the supply line A is disconnected from the bus section AA but may be reconnected thereto when conditions become normal. But, in the second instance, as when the fault is in the transformer, the supply line cannot be automatically reconnected thereto but is locked out and precluded from being reconnected to the bus section until the faulty conditions, that caused the line to be locked out, are eliminated or cleared by an attendant.

The operation that occurs when the supply line is disconnected because of abnormal line conditions will be considered first.

Upon the occurrence of such abnormal line conditions, the relay 27 is permitted to close its switch 27a whereupon the relay 71 is energized to close its switches 73 and 74. It will be remembered that the supply line A has been providing energy for the section AA, and supply line B has been providing energy for section BB. The interrupters 70 and 80 are open. Upon the energization of the relay 71, two circuits are completed by the switches 73 and 74, respectively. Switch 73 completes a circuit to energize the trip coil 15 of the interrupter 10, from positive control conductor through the switch 73, and the trip coil 15 and the switch 17 of the interrupter 10 to the negative control conductor. The high-tension interrupter 10 is thereupon opened.

After the interrupter 10 is opened, the closing of interlock switch 22 completes the circuit of the low-tension trip coil 15a and the low-tension interrupter 11 is thereupon opened. It will be noted that circuits are established by switches 22 and 22a that energize the reset coils 38 and 38a of the transfer relays 25 and 25a, respectively. The circuits of the reset coils are thereupon opened by the associated switches 32 and 32a, and the switches 39 and 39a are closed to permit the circuits of the closing-coil switches 24 and 24a to be established later.

As soon as the supply line A is disconnected from its bus section AA, the total load decreases to the value that is connected to, and supplied from, the bus section BB. The underload relay 100, therefore, closes its switch and energizes relay 96. Relay 96, when energized, closes switch 99 which completes the circuits of the closing-coil relay switches 24 associated with the interrupters 70 and 80, respectively. These interrupters are, therefore, closed and the total load on bus sections AA and BB is put upon the supply line B. The underload relay 100 is immediately energized to open its switch, and the overload relay 90 is energized to close its switch.

We now have supply line B connected to both bus sections AA and BB and the interrupters 70 and 80 are closed. The auxiliary supply line C is still to be connected to bus section AA, and the interrupter 80 is to be opened in order that the supply lines B and C may provide energy for the separate bus sections.

As soon as the switch of the overload relay 90 is closed, the relay 91 is energized to close switch 95. At the same time, switch 97 of relay 96 is also closed, since the relay switch 100 is open. A circuit is thereupon completed from positive control conductor through switch 95 of relay 91, switches 23 and 23a of the interrupters 10 and 11, switch 97 of relay 96 and the operating coil of relay switch 85 to negative control.

The relay switch 85 is thereupon closed to complete a circuit from positive control through switch 67b of the phase relay 67, which is closed if conditions on line C are normal, and then, through the operating coil of the closing coil relay 64 of the interrupter 50 and switches 39 of the relays 65 and 66, respectively, to negative control. The high-tension interrupter 50 is thereupon closed and, subsequently, the low-tension interrupter 51 is also closed. The auxiliary supply line C is now connected to the bus section CC. It is now merely necessary to open the interrupter 80.

The circuit of the trip coil 15 of the interrupter 80 may be traced from negative control through switches 18 and 18a of the interrupters 30 and 31, switch 17 and trip coil 15 of interrupter 80, switches 19a and 19 of interrupters 51 and 50, and the switch 98, of relay 96, to positive control. Switch 98 will be closed, since the load is such as to maintain the switch of the relay 100 open and the relay 96 de-energized. The trip coil of the interrupter 80 is, therefore, energized to open the interrupter.

The sequence of operation has now been traced whereby, upon the occurrence of abnormal conditions on the supply line A, that line is disconnected from its bus section; the interrupters 70 and 80 are reclosed to connect the total load to the line B; the auxiliary supply line C is connected to the bus section CC to take a share of the load; and the interrupter 80 is opened to permit the supply line B to provide energy to its own bus section BB, and the auxiliary supply line C to provide energy to the bus section AA.

*Lines "A" and "B" connected to system. Line "B" becomes faulty. Line "C" is substituted for line "B".*

Let it be assumed that the supply line B becomes faulty instead of the supply line A, while each is connected to its respective bus secton. The supply line B will be disconnected and the interrupters 70 and 80 will be closed, as previously described, by the operation of the underload relay 100 and the subsequent closing of the switch 99. The abnormal conditions on line B will effect closing of switch 47a of the phase relay 47, and the energization of relay 81 with the subsequent closing of switch 83. When the interrupters 70 and 80 are closed and the entire load is put upon the supply line A, relay 90 again effects the energization of relay 91.

Upon the subsequent closing of the switch 95, a circuit is completed from positive control through the switch 95, the switch 83 of the relay 81 and the operating coil of the relay 85, to negative control. The relay 85 is thereupon operated to close its switch which completes the energizing circuit for the closing-coil-contactor relay 64 of the interrupter 50. The auxiliary supply line C is thereupon connected to the bus section CC.

Since the load exceeds the capacity of one transformer, the relay 100 is sufficiently energized to open its switch to maintain the relay 96 de-energized. Upon the closing of the interrupters 50 and 51, a circuit is completed from positive control through switch 98 of the relay 96, switches 18 and 18a, of the interrupters 50 and 51, the switch 17 and the trip coil of the interrupter 70 and switches 18a and 18 of the interrupters 11 and 10 to negative control. The interrupter 70 is therefore tripped as soon as the auxiliary supply line C is connected to the bus section CC.

I have now shown how the auxiliary supply line C is substituted for either the supply line A or the supply line B while both are providing energy for their respective bus sections and either supply line becomes faulty and ineffective.

*Lines "A" and "C" supplying energy. Load decreases. Line "C" disconnected.*

Let the apparatus now be considered in the position in which it has been left in the last operation, namely, supply line A providing energy for the bus section AA and the auxiliary supply line C providing energy for the bus section BB. If the load decreases to, or below, the full-load capacity of one line, both bus sections AA and BB will be connected to the supply line A, and the auxiliary supply line C will be disconnected from its bus section.

If, however, while the supply lines A and C are connected as they were left after the last operation, the supply line A should become faulty or ineffective while the load decreases to, or below, the full-load capacity of one line, the supply line A will be disconnected and the auxiliary supply line C will supply energy to both sections AA and BB. Let the condition first be assumed where supply line A is normal and the load decreases to, or below, the capacity of that line. The relay 100 closes its switch and energizes relay 96. The switch 99 thereupon closes the interrupter 70. Supply line A is now connected to bus sections AA and BB. Upon the closing of the interrupter 70, a circuit is completed from positive control through switches 18 of interrupters 80 and 70, switches 19a and 19 of interrupters 11 and 10, switch 92 of relay 91, and the trip coil and switch 17 of interrupter 50 to negative control. The supply line C is thereupon disconnected from the system.

*Lines "A" and "C" connected to system. Line "A" becomes faulty. Line "C" supplies total load.*

Let the other condition be assumed, that is, supply line A supplying energy to bus section AA and auxiliary supply line C supply energy to bus section BB with the load decreased to, or below, the full-load capacity of one line and supply line A faulty or ineffective. As soon as supply line A becomes faulty or ineffective, by reason of abnormal line conditions, the relay 27 closes its switch 27ª to energize the relay 71. As previously described, switch 73 effects the disconnection of the supply circuit A from the bus section AA.

As soon as supply line A is disconnected from the bus section AA, the connecting load is such that the relay 96 is energized by the underload relay 100. The closing of switch 99 immediately closes interrupter 70 to connect the bus section AA also to the supply line C. The auxiliary supply line C is now supplying energy to both sections AA and BB since the main supply lines A and B are both faulty or ineffective. Under such conditions in lines A and B, the auxiliary line C will supply energy until abnormal conditions should occur in the line or in the apparatus. Upon the occurrence of abnormal line conditions, the phase relay 67 would close its switch 67a to trip the interrupters 50 and 51.

If the total load on the bus sections is less than the full-load capacity of one transformer and the abnormal conditions on either line A or line B should be cleared, the entire load will be immediately transferred to the preferred line which has been rendered normal, and the auxiliary supply line C will be disconnected from the system. These operations will now be explained.

*Line "C" supplying total load. Line "A" becomes normal and replaces line "C".*

As soon as conditions in line A are rendered normal, relay 27 is energized to open its switch, thereupon de-energized relay 71. Switch 72 is then permitted to close to complete the circuit for the closing coil relay 24 associated with the interrupter 10, as previously described. The supply line A is then connected to the bus section AA.

Since the load is less than the capacity of the supply line A, switch 92 of relay 91 will be closed. Upon the closing of the interrupters 10 and 11, the circuit of the trip coil of the high-tension interrupter 50 of the auxiliary supply line C will be energized. This circuit is completed from positive control, through switches 18 of interrupters 80 and 70, respectively, switches 19a and 19 of interrupters 11 and 10, switch 92 of relay 91, and trip coil 15 and switch 17 of interrupter 50 to negative control. The high-tension interrupter 50 is opened and the low-tension interrupter 51 is also subsequently opened to disconnect the auxiliary supply line C from the bus section CC.

*Line "C" supplying total load. Line "B" becomes normal and replaces line "C".*

If, while line C is supplying the total load because both lines A and B have become abnormal, line B should become normal and line A should remain abnormal, line B will be connected to supply the total load and line C will be disconnected from the system. This operation is initiated by the energization of the relay 47 to open its switch 47a, thereby deenergizing the relay 81. The switch 82 is thereupon permitted to close and the switches 83 and 84 are permitted to open. When the switch 82 is closed, a circuit is thereby completed for energizing the closing coil contactor switch 44 that is associated with the interrupter 30. The supply line B is then connected to the bus section BB as previously described.

Since the total load is less than the capacity of one supply line, the underload relay 100 will close its switch to energize the relay 96. The circuit interrupters 50 and 51 are then opened in the manner previously described to disconnect the auxiliary supply line C from the bus section CC and to cause the supply line B to supply the total load demand.

The main supply line A is the preferred line and will always take the load when such load is not greater than the full-load capacity of one line. Thus, if the supply line A, for some reason, should be disconnected from the bus section AA and energy should then be supplied by either of the lines B and C, the supply line A, upon being rendered normal, will immediately be connected to the bus section AA and the other line B or C, as the case may be, will be disconnected therefrom.

*Supply line "A" connected to the system. Line "A" becomes faulty. Line "B" connected to system.*

The operation of the system will now be considered, showing the connection of the supply lines in a predetermined or preferred sequence upon the occurrence of abnormal conditions in one or more lines.

Under the conditions assumed, the supply line A is connected to the system and supplies energy to the bus sections AA and BB. Upon the occurrence of abnormal conditions in the supply line A, its disconnection may be effected by two relays. Such disconnection may be effected first, by the closing of the switch 73 of relay 71 upon the occurrence of abnormal voltage or phase conditions in the supply line; or it may be effected secondly, by the closing of the switch 78 of relay 76, the operation of which is controlled by the lock-out relay 26 in response to such abnormal conditions in the apparatus in the station as would cause the thermal relay 28 to close its switch. Such other relays as might be employed in the station for the protection of the apparatus would similarly complete the circuit of the operating coil of the lock-out relay 26 upon the occurrence of such abnormal conditions in the apparatus as would render it desirable that an attendant inspect the apparatus before permitting its reconnection to the system. Thus, upon the occurrence of any abnormal conditions in the supply line A or in the apparatus associated therewith, that supply line is immediately disconnected from the system.

Immediately upon the occurrence of the abnormal conditions in the line A, the relay 75 is energized to close its switch. If the abnormal conditions are such as to cause the phase and voltage relay 27 to close its switch, the energizing circuit of the relay 75 is completed from positive control through the interlock switches 20 of the interrupters 80 and 70 and the switch 74 of the switch 71 through the operating coil of the relay 75 to negative control. If the abnormal conditions are such as to effect the operation of the relay 76, the relay 75 is energized through the same circuit as just outlined with the exception of the substitution of the switch 72 of the relay 71 and the switch 77 of the relay 76 for the switch 74, previously mentioned.

If the supply line B is normal, the relay 75, associated with the supply line A, immediately effects the connection of the supply line B to the system by completing a circuit to energize the closing-coil contactor switch 44 of the high-tension interrupter 30 in the supply line B. The circuit is completed by the relay switch 75 from positive control through switch 82 of relay 81, associated with the supply line B, closing-coil contactor switch 44 and the switches 39 of the relays 45 and 46 to negative control. The supply line B is thereupon connected to the system.

*Supply line "A" connected to system. Line "A" becomes faulty. Line "B" is faulty. Line "C" connected to system.*

If, under the above conditions, the supply line B should have been abnormal, upon the occurrence of faulty conditions in the supply line A, supply line C would be connected to the system. While abnormal conditions exist in the supply line B, either the relay 81 or the relay 86 will be energized. If the abnormal conditions are such that the relay 81 is energized, the switch 82 will be open, and the circuit of the closing-coil contactor switch 44 of the interrupter 30 cannot be completed by the relay 75, that is associated with the supply line A. The circuit of the relay 85 that is associated with line B is, however, completed from positive control through the relay switch 75, the switch 83 of the relay 81, and the operating coil of the relay 85 to negative control, thereby energizing the relay 85 to close its switch.

Had the abnormal conditions been such as to effect the operation of the relay 86, the circuit of the closing-coil contactor switch 44 similarly could not have been completed by reason of the switch 39 of the lockout relay 46 being open. The relay 85 would then have been energized by the circuit from positive control through the switch of relay 75, the switch 82 of relay 81, the switch 87 of relay 86 and the operating coil of the relay 85 to negative. In either case, the relay 85 would be energized to close its switch.

If the conditions in line C are normal when the switch of relay 85 is closed, a circuit will be completed by the relay 85 from positive control through the switch 67b of the phase voltage relay 67, the closing coil of the switch 64 and the switches 39 of the relays 65 and 66. The closing coil of the high-tension interrupter 50 would thereupon be energized to close the interrupter, and the supply line C would subsequently be connected to the system and remain so connected until either line A or line B should become normal. Under such conditions, the normal line would be reconnected to the system and the line C disconnected therefrom. The operation of the system under such conditions was previously outlined.

*Line "A" faulty and disconnected from system. Line "B" connected to system. Load increases. Line "C" thereupon connected to system.*

It was shown above that the connection of the supply line C to the system is controlled by the closing of the relay 85. If the load on the supply line B should increase above the capacity of that line while the supply line A was disconnected from the system, by reason of abnormal conditions therein, the relay 85 would be energized by the completion of a circuit from positive control through either the switch of relay 75 or the switch 95 of the auxiliary overload relay 91 through the switches 23 and 23a of the interrupters 10 and 11 of the supply line A, the switch 97 of the auxiliary underload relay 96 through the operating coil of the relay 85 to negative control. Supply line C would thereupon be connected to the bus section CC to provide energy to the bus section AA. Under such conditions, the interrupter 80 would be opened to disconnect the bus section BB from the bus section CC.

The trip coil of the interrupter 80 is energized, as previously outlined, from positive control through the switch 98 of the auxiliary underload relay 96, the switches 19 and 19a of the interrupters 50 and 51, the trip coil and the auxiliary interlock switch 17 of the interrupter 80 and the switches 18a and 18 of the interrupters 31 and 30, respectively. The interrupter 80 is thereupon disconnected to permit the supply line B to provide energy to the bus section BB, and the supply line C to provide energy to the bus section AA.

*Line "A" becomes normal and is connected to system. Line "B" is already connected to system. Line "C" is thereupon disconnected from system.*

If, now, while the supply lines B and C are providing energy to the bus sections BB and AA, respectively, the supply line A should become normal, it will immediately be reconnected to the bus section AA, as previously outlined. The interrupter 70 will thereupon be opened, as previously outlined, by reason of the supply lines A and B being connected to their respective bus sections. Both bus-section interrupters 70 and 80 being open, a circuit is completed for effecting the disconnection of the supply line C from its bus section. This circuit is completed by switches 23 of the interrupters 70 and 80 from positive control through the trip coil 15 and the switch 17 of the interrupter 50 to negative control. The interrupters 50 and 51 are thereupon opened to disconnect the supply line C from the bus section CC, and the supply lines A and B are permitted to supply energy to their respective bus sections AA and BB.

It is thus observed that, by means of the two selective control relays 90 and 100 that are responsive to the load demand, complete automatic and selective operation of the supply lines may be effected to maintain continuity of the operation, and most efficient operation of the transformers.

While I have shown only three supply lines in the present system, it is obvious that any number of lines may be employed and connected to provide energy to a plurality of bus sections in a predetermined or preferred sequence of operation.

Although I have shown specific types of apparatus and have illustrated the protection of the supply lines by means of relays of the thermal type, I do not limit the construction of the system embodying my invention to such apparatus, since the system may be variously modified within the spirit and scope of the invention, as set forth in the appended claims.

I claim as my invention:

1. In a power-distribution system, the combination with a plurality of main sources of energy and an auxiliary source of energy, a main bus section for each main source of energy and an auxiliary bus section for the auxiliary source of energy, of means for connecting the several sources of energy to corresponding bus sections including an auxiliary bus section for the auxiliary source of energy, means for connecting the auxiliary bus section to each of the main bus sections, a trip coil for the means connecting the auxiliary source of energy to the auxiliary bus section, and a control circuit for said trip coil comprising switches actuated by or with the connecting means between the auxiliary bus section and the main bus sections; switches actuated by or with the connecting means of the main sources of energy; and a switch controlled in accordance with the load demand on the bus sections.

2. In a power-distribution system, the combination with a plurality of main sources of energy and an auxiliary source of energy, a main bus section for each main source of energy and an auxiliary bus section for the auxiliary source of energy, of means for connecting the several sources of energy to corresponding bus sections including an auxiliary bus section for the auxiliary source of energy, means for connecting the auxiliary bus section to each of the main bus sections, a trip coil for the connecting means operating between the auxiliary bus section and one main bus section, and a control circuit for said trip coil comprising switches respectively controlled by or with the connecting means of two of the sources of energy and a switch controlled in accordance with the value of the load demand.

3. In a power-distribution system, the combination with a plurality of sources of energy, and a feeder bus, of means for connecting the several sources of energy to said feeder bus, and means for controlling the various connecting means to permit one source of energy to supply the demand on said bus so long as such demand does not exceed the capacity of said source, and for substituting additional sources of energy within an interval of time after such demand exceeds a predetermined value that is substantially in inverse proportion to the excess of the load demand above this value.

4. In a power-distribution system, the combination with a plurality of sources of energy and a plurality of bus sections therefor, of means for connecting the bus sections to one source of energy while the load demand does not exceed the full-load capacity of the one line, and for connecting each source of energy to the corresponding bus section and disconnecting the bus sections within an interval of time after the load demand exceeds the full-load capacity of the first source of energy that is substantially in inverse proportion to the excess of the load demand above this capacity.

5. In a power-distribution system, the combination with a plurality of sources of energy and a plurality of bus sections therefor, of means for connecting the bus sections to one source of energy while the load demand does not exceed the full-load capacity of the one line, for connecting each source of energy to the corresponding bus section and disconnecting the bus sections when the load demand exceeds the full-load capacity of the first source of energy, and for reconnecting the bus sections to each other and to one source of energy within an interval of time after the load demand falls below the full-load capacity of one line that is substantially in inverse proportion to the difference between the load demand and the full-load capacity of one line.

6. In an electrical system, the combination with a plurality of sources of energy and a plurality of bus sections therefor, of means for connecting the bus sections to one source of energy while the load demand on the bus sections does not exceed the capacity of said source of energy, for connecting each source of energy to a corresponding bus section and disconnecting the bus sections from each other within an interval of time after the load demand on the bus sections exceeds the capacity of the source of energy to which they are connected that is substantially in inverse proportion to the excess of such demand over such capacity, and for reconnecting the bus sections to each other and disconnecting one of the sources of energy therefrom within an interval of time after the load demand on the bus sections falls below the capacity of one source of energy that is substantially in inverse proportion to the difference between such demand and such capacity.

7. In a power-distribution system, the combination with a plurality of sources of energy, and a feeder bus, of means for connecting the several sources of energy to said feeder bus, and means for controlling the various connecting means to permit one source of energy to supply the demand on said bus so long as such demand does not exceed the capacity of said source, and for substituting additional sources of energy within an interval of time after such demand exceeds a predetermined value that is dependent upon the excess of the load demand above this value.

8. In a power-distribution system, the combination with a plurality of sources of energy and a plurality of bus sections therefor, of means for connecting the bus sections to one source of energy while the load demand does not exceed the full-load capacity of the one line, and for connecting each source of energy to the corresponding bus section and disconnecting the bus sections within an interval of time after the load demand exceeds the full-load capacity of the first source of energy that is dependent upon the excess of the load demand above this capacity.

9. In a power-distribution system, the combination with a plurality of sources of energy and a plurality of bus sections therefor, of means for connecting the bus sections to one source of energy while the load demand does not exceed the full-load capacity of the one line, for connecting each source of energy to the corresponding bus section and disconnecting the bus sections when the load demand exceeds the full-load capacity of the first source of energy, and for reconnecting the bus sections to each other and to one source of energy within an interval of time after the load demand falls below the full-load capacity of one line that is dependent upon the difference between the load demand and the full-load capacity of one line.

10. In an electrical system, the combination with a plurality of sources of energy and a plurality of bus sections therefor, of means for connecting the bus sections to one source of energy while the load demand on the bus sections does not exceed the capacity of said source of energy, for connecting each source of energy to a corresponding bus section and disconnecting the bus sections from each other within an interval of time after the load demand on the bus sections exceeds the capacity of the source of energy to which they are connected that is dependent upon the excess of such demand over such capacity, and for reconnecting the bus sections to each other and disconnecting one of the sources of energy therefrom within an interval of time after the load demand on the bus sections falls below the capacity of one source of energy that is dependent upon the difference between such demand and such capacity.

11. In an electrical system, the combination with a plurality of supply circuits, a plurality of corresponding load circuits, means for connecting each supply circuit to the corresponding load circuit, means for connecting the load circuits together, time-delay means responsive to the total load demand on the load circuits for controlling the operation of said connecting means, and substantially instantaneous operating means responsive to abnormal conditions in the supply circuits for controlling the operation of said connecting means.

In testimony whereof, I have hereunto subscribed my name this 21st day of March, 1922.

CHARLES McL. MOSS.